United States Patent [19]

Mohri et al.

[11] 3,914,536

[45] Oct. 21, 1975

[54] IDENTIFIER FOR A PULSE CODE MODULATED SIGNAL

[75] Inventors: Katsuo Mohri, Yokohama; Michio Masuda, Tokyo; Teruhiro Takezawa, Komae; Hiroaki Nabeyama; Takehiko Yoshino, both of Yokohama; Takashi Uehara, Inagi, all of Japan

[73] Assignees: Hitachi Limited; Nippon Hoso Kyokai, both of Tokyo, Japan

[22] Filed: Aug. 27, 1973

[21] Appl. No.: 391,867

[30] Foreign Application Priority Data

Aug. 30, 1972 Japan ............................. 47-86276

[52] U.S. Cl...... 178/5.8 R; 178/DIG. 23; 179/15 BS

[51] Int. Cl.[2] ........................................ H04N 5/04

[58] Field of Search........... 178/5.6, 5.8 R, DIG. 23, 178/69.5 TV, 69.5 R; 325/39; 179/15 BS

[56] References Cited

UNITED STATES PATENTS

| | | | |
|---|---|---|---|
| 3,639,780 | 2/1972 | Lovelace | 178/7.35 X |
| 3,755,624 | 8/1973 | Sekimoto | 178/69.5 TV |
| 3,865,973 | 2/1975 | Masuda et al. | 178/5.8 R |

*Primary Examiner*—Benedict V. Safourek
*Assistant Examiner*—Mitchell Saffian
*Attorney, Agent, or Firm*—Stevens, Davis, Miller & Mosher

[57] ABSTRACT

An identifier for detecting a pulse code modulated signal from a composite signal comprising a video signal and a pulse code modulated audio signal alternately transmitted in a predetermined sequence and having a plurality of synchronizing signals including a pulse series synchronized with the modulated pulse series. The identifier comprises, a circuit for reproducing a synchronizing signal synchronized with the modulated pulse series of the pulse code modulated signal, a circuit for detecting the amplitude of a signal transmitted from the transmitter side at a predetermined period and always in a constant amplitude, a gain control circuit for controlling the gain of the incoming signal based on the detected variation of the amplitude of the constant amplitude signal, and a circuit for detecting the composite signal which had passed the gain control circuit by using the reproduced synchronizing signal. The identifier further comprises a clamp circuit for fixing the dc level of the composite signal before the detecting means.

8 Claims, 12 Drawing Figures

IDENTIFIER FOR A PULSE CODE MODULATED SIGNAL

BACKGROUND OF THE INVENTION

The present invention relates to an identifier for correctly identifying a pulse code modulated signal.

More particularly, the present invention relates to an identifier for correctly identifying a pulse code modulated audio signal or synchronizing signals from a composite signal, for instance a still picture broadcasting signal, comprising a video signal and a pulse code modulated audio signal each appearing in a predetermined duration and alternately transmitted in a predetermined sequence, and further comprising a first synchronizing signal synchronized with the modulated pulse series and a second synchronizing signal including a number of synchronizing signals being sequentially inserted in certain locations in the video and audio signals.

The present invention is particularly suitable for use in a receiver for a still picture broadcasting signal.

In a still picture signal transmission system, the video and audio signals are transmitted alternately in a predetermined sequence. In one type of a still picture broadcasting signal, a 1/30 second period video signal and 1/15 second period audio signal are alternately transmitted, i.e., transmitted in different time slots. The video signal is transmitted at each horizontal scanning period of $1/f_H$ (=63.5 $\mu$s) just the same as a standard television signal and the audio signal is transmitted as a pulse code modulated time division multiplex signal and at a different period $1/f_A$ different from that of the video signal. Accordingly, the required synchronizing signals for reproducing the video and audio signals are transmitted in different periods namely in the $1/f_H$ period during the transmission of the video signal and the $1/f_A$ period during the transmission of the audio signal. The synchronizing signal comprises a blanking period, a PCM frame pattern signal (PFP signal) comprising a 16 bit signal which is synchronized with the modulated pulse series of the audio multiplex signal and a mode control code signal (MCC signal) comprising a horizontal synchronizing signal, audio frame synchronizing signal, frame signal etc.

In order to identify the PCM signal at the reception of such a still picture broadcasting signal, at first it is necessary to reproduce the bit synchronizing signal synchronized with the modulated pulse series of the pulse code modulated signal. Then the PCM signal is identified by using the reproduced bit synchronizing signal. In such a case there have been the following problems. Although from the transmitter end, a coded pulse signal having a correct waveform is transmitted, owing to possible distortion in the transmission path, or by possible limitation of the obtainable frequency range in the receiver or more particularly in the processing circuits such as an amplifier or detector therein, the received signal in a receiver is usually distorted to become a signal which lacks a high frequency component, in other words it becomes a signal having an elongated or smoothed leading or trailing edge. Such a distorted receiving signal should be shaped to be a correct waveform by identifying the exact signal level by using a timing signal synchronized with the bit synchronizing signal. Besides the waveform distortion by the frequency characteristics of the transmission path or deviation of gain in the amplifier or detector in the receiver, the received signal contains a variation or fluctuation in the amplitude or its dc level. In case such variation occurs, a correct identification of the signal is not possible.

SUMMARY OF THE INVENTION

The present invention has for its object to provide a novel and effective identifier of the aforementioned type.

Another object of the present invention is to provide an identifier which can make correct identification even if the input signal includes amplitude variation.

A still further object of the present invention is to provide an identifier which is able to make an accurate identification by suppressing amplitude variation or dc level fluctuation of the received input signal.

According to one aspect of the present invention the identifier for identifying a pulse code modulated audio signal and pulse code modulated synchronizing signal from a composite signal comprising a video signal and a pulse code modulated audio signal alternately transmitted in a predetermined sequence and having synchronizing signals inserted in predetermined locations of the video and audio signals, comprises a means for reproducing a bit synchronizing signal synchronized with the modulated pulse series of the pulse code modulated signal included in the composite signal, a means for detecting the amplitude of a signal transmitted at a predetermined period in the composite signal from the transmitter end at a constant amplitude, a gain control circuit varying the gain in accordance with the detected amplitude, and a means for identifying an input signal obtained by passing it to the gain control circuit by using said reproduced bit synchronizing signal.

In accordance with the present invention an input signal which may include amplitude variation is processed to compensate the amplitude variation and the dc level is stabilized so that an accurate identification without identification error can be achieved.

Figure 4:
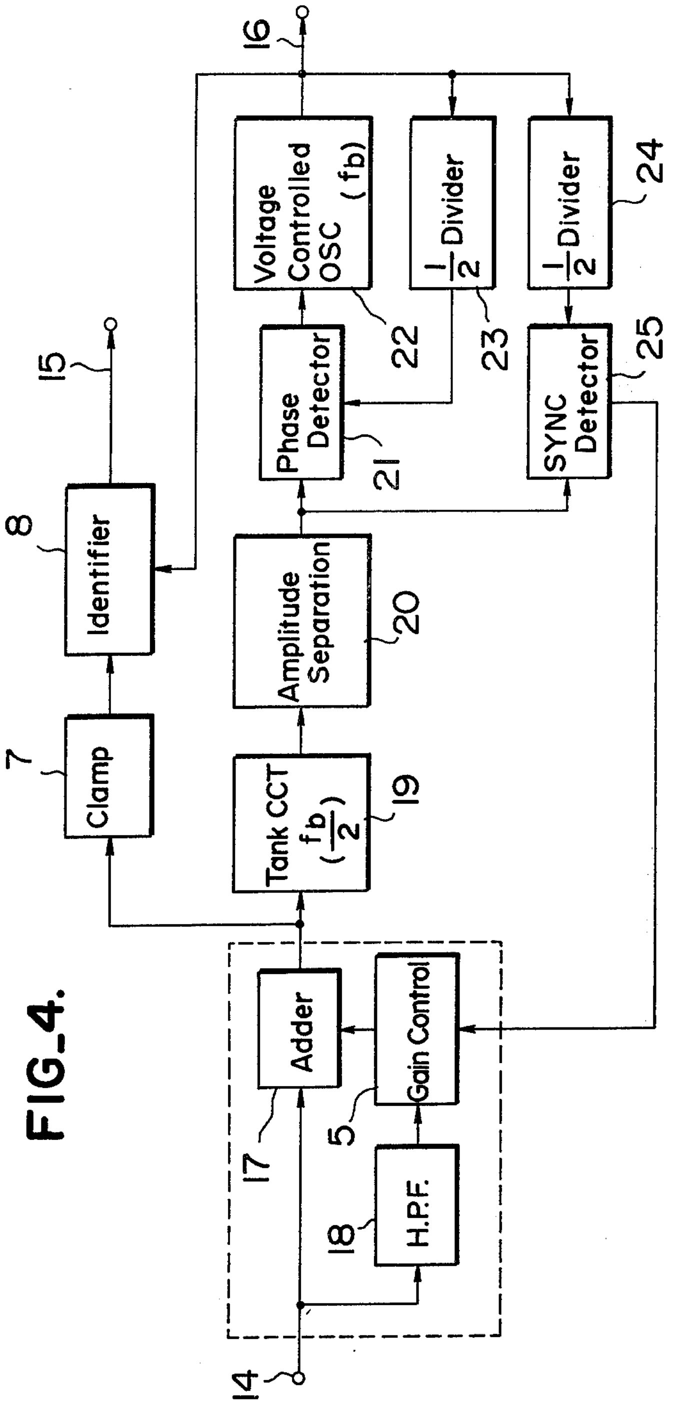
FIG. 4 is a block-diagram for showing a different embodiment of the present invention.
Figure 7:
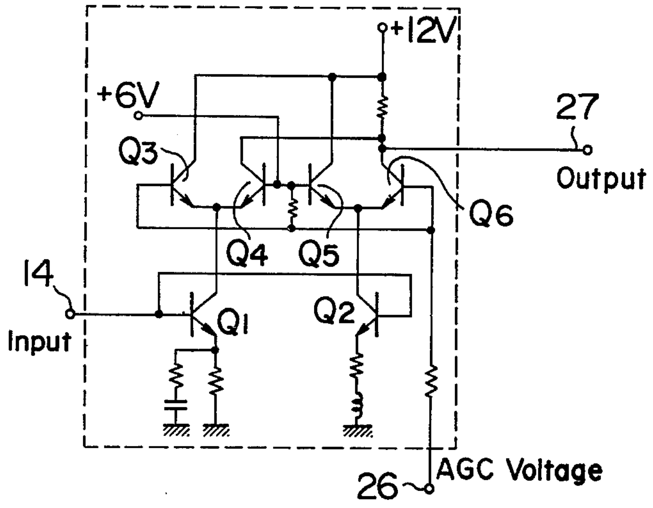

FIGS. *5a–5d* illustrate frequency characteristic curves for explaining the function of the embodiment of the present invention shown in FIG. 4;

FIGS. *6a–6c* illustrate signal waveforms in the embodiment shown in FIG. 4; and FIG. 7 is a circuit diagram for showing a practical circuit arrangement of the portion of a high-pass-filter, gain control circuit and adder shown in FIG. 4.

DESCRIPTION OF THE PREFERRED EMBODIMENTS

As a preferred embodiment of the composite signal to be received by a receiver equipped with an identifier of the present invention, a still picture broadcasting signal will be explained briefly for its composition by referring to FIGS. **1*a* and 1*b***.

Figures 1, 3:
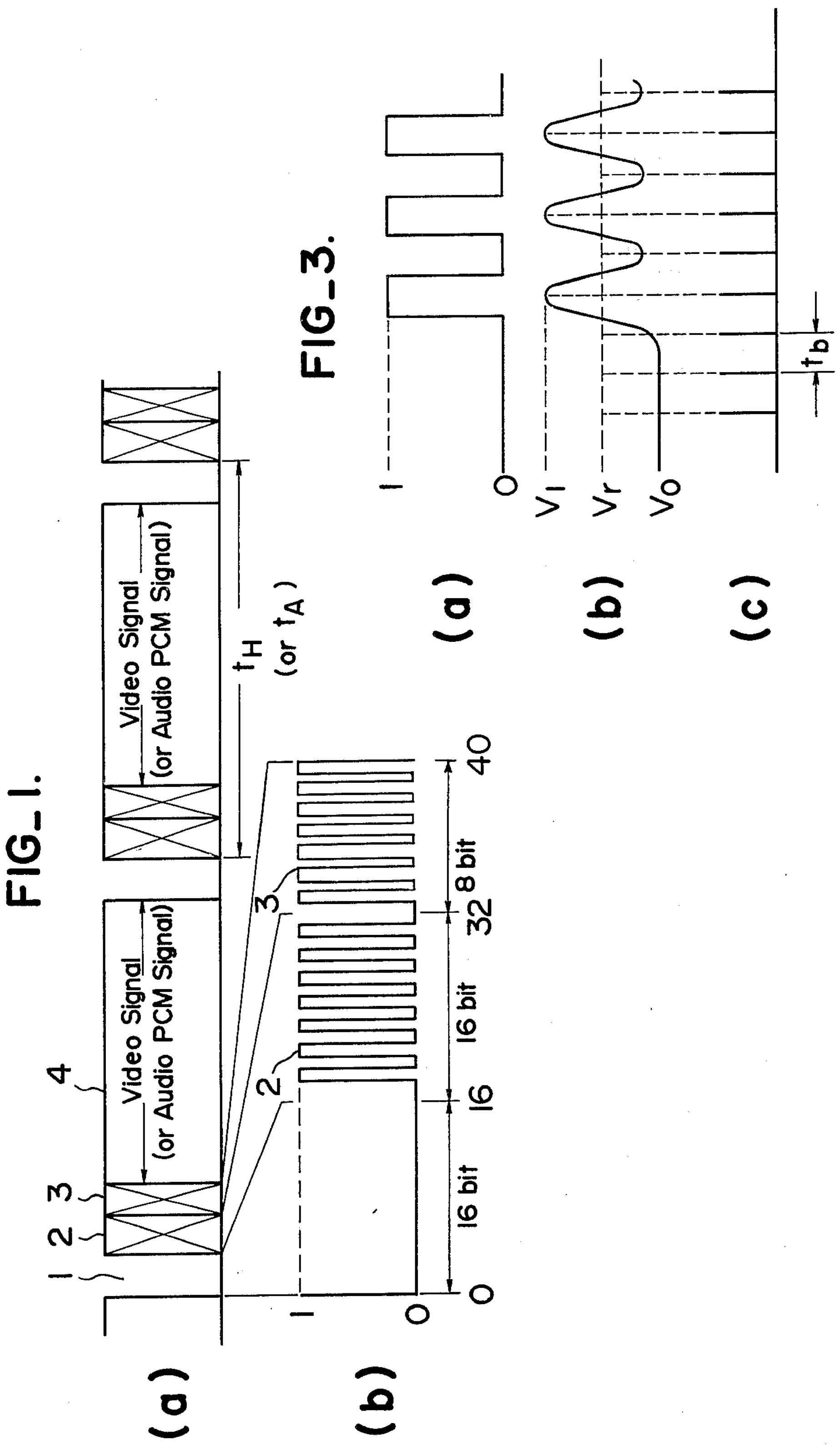
FIG. 1 shows diagrams for explaining the formation of a still picture broadcasting signal.
FIG. 3 is a signal waveform diagram for explaining pulse signal identification.

FIG. 1*a* is a waveform diagram, for explaining the still picture broadcasting signal. In FIG. 1*a*, 1 is a blanking period, 2 and 3 are synchronizing signals, wherein 2 is termed a PCM frame pattern signal (hereinafter referred to a PFP signal) and 3 is termed a mode control code signal (hereinafter referred to as a MCC signal). 4 represents the period for the transmission of the information signal during which the video signal or the audio signal is transmitted in time division multiplex in a predetermined period. Peak amplitude of the information signal is selected to be nearly equal to that of the synchronizing signal 2, 3 in order to obtain a good S/N ratio of the transmitted signal. FIG. 1*b* is a diagram in which the time axis is enlarged for the portion including blanking period 1, PFP signal 2 and MCC signal 3. Succeeding the 16 bit blanking period 1, the PFP signal is transmitted in the form of a 16 bit signal having the illustrated waveform of a fixed pattern of 0101 . . . . The MCC signal transmitted thereafter is composed of 8 bits and by a presence or absence of the respective pulses an identification can be made as to whether the succeeding information signal represents a video signal or an audio signal, whether the period containing the inserted PFP signal is a horizontal scanning period or a PCM audio frame period, and other information.

The information signal means either a video signal or an audio signal. The video signal is transmitted during a horizontal scanning period of $t_H$ ($\approx$63.5 $\mu$s), just the same as a standard television signal. The audio signal is transmitted as a pulse code modulated (PCM) multiplex signal. The PCM audio frame period is selected to be $t_A$ which is different from the horizontal period $t_H$. The relation between the PCM audio frame period $t_A$ and the horizontal period $t_H$ is so chosen as to be a simple integer ratio. For instance, it is selected as:

$$t_A : t_H = 3 : 2$$

By this selection, operation in a receiver can be made very convenient. The bit period $t_b$ of the PCM audio signal, which also corresponds to the bit period of the pattern of the PFP signal, is selected to be an integer ratio with the horizontal period $t_H$. For instance, it is selected as:

$$t_H = 416\ t_b$$

The identifier according to the present invention which identifies the pulse code modulated signals at the reception of the abovementioned composite signal will be explained by referring to the accompanied drawings.

Figure 2:
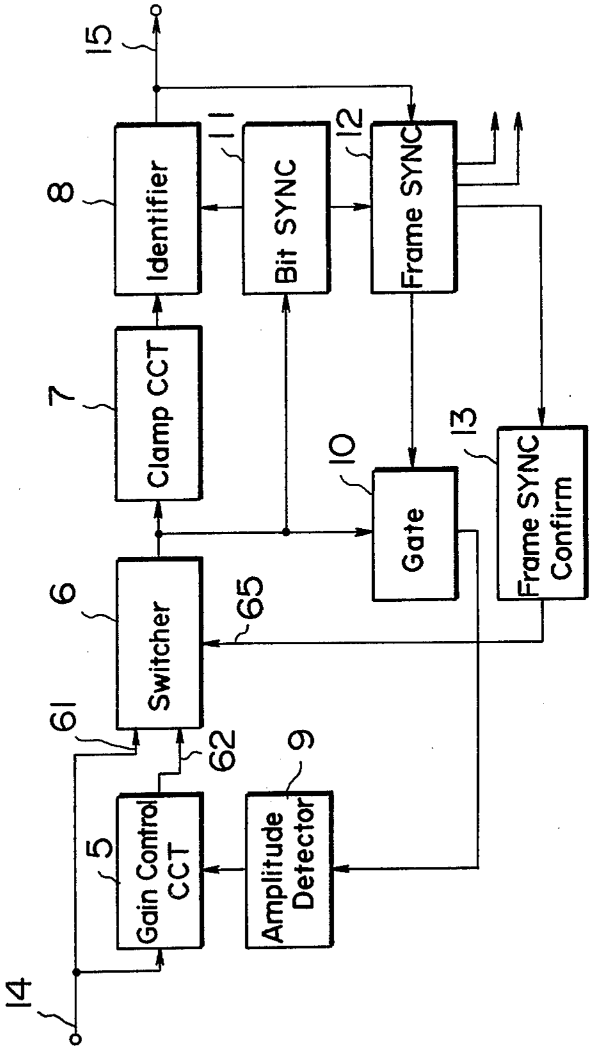
FIG. 2 is a block-diagram for showing one embodiment of the present invention.

FIG. 2 is a block-diagram of an embodiment of the present invention, and FIG. 3 shows signal waveform diagrams for explaining identification of the pulse signals.

In FIG. 2, 14 is an input terminal of the still picture broadcasting signal, 5 is the gain control circuit, 6 a switcher which passes either of the incoming signal applied from its input terminals 61 or that from 62, 7 a clamp circuit for clamping the dc level, 8 an identifier, 9 an amplitude detector, 10 a gate circuit, 11 a bit synchronizing signal regenerator, 12 a frame synchronizing signal regenerator which reproduces a signal synchronized with the period of the PFP signal which is repeated at the horizontal scanning period $t_H$ or repetition period of the PCM audio frame period, and 13 is a confirming circuit for frame synchronization confirming whether the period of the output signal of the frame synchronizing circuit coincides with $t_H$ or $t_A$.

The pulse signal forming a part of the still picture broadcasting signal has the waveform as shown in FIG. 3 at a time before the transmission. However, after passing through the transmission path or after receiving distortion in the processing circuit in the receiver, the waveform is distorted as shown in FIG. 3*b*, which waveform appears at the input terminal 14. This input signal is applied to one input terminal 61 of the switcher 6, and is further applied to the other input terminal 62 of the same switcher 6 after passing through the gain control circuit 5. This switcher 6 passes the input signal applied to the input terminal 61 to its output until frame synchronization is established, and passes the input signal applied to its input terminal 62 as its output after the establishment of the frame synchronization, which signal had passed through the gain control circuit 5.

At the beginning of the operation, the signal applied to the input terminal 61 appears at the output of the switcher 6 and is applied to three circuits, i.e. to the clamp circuit 7, to the bit synchronizing signal regenerator 11 and to the gate circuit 10. The bit synchronizing signal regenerator 11 derives out a signal having a bit period $t_b$ from the PFP signal and from the PCM audio signal in the received still picture broadcasting signal and controls the phase of a bit period oscillator provided therein and regenerates a bit synchronizing signal. The reproduced bit synchronizing signal is supplied to identifier 8. The identifier 8 utilizes the regenerated bit synchronizing signal as the timing wave and identifies the still picture broadcasting signal of which the dc level had been fixed by the clamp circuit 7 and produces a pulse signal output without waveform distortion at the output terminal 15. The timing wave using the bit synchronizing signal has the waveform as shown in FIG. 3*c*. The input signal level as shown in FIG. 3*b* is judged whether its level is higher than a reference voltage level $V_r$ or is lower than it at each time when the pulse signal is supplied. However, in this stage if the level of the input still picture broadcasting signal fluctuates, the output signal derived from the identifier 8 may include a false pulse signal.

The regenerated bit synchronizing signal from the bit synchronizing signal regenerator 11 is further supplied to the frame synchronizing signal regenerator 12 and a signal having the horizontal scanning frequency $f_H(=1/t_H)$ and that having the audio PCM frame frequency $f_A(=1/t_A)$ are generated by counting down the bit synchronizing signal. In this connection, the output pulse signal derived from the identifier 8 is also applied to the frame synchronizing signal regenerator 12. In this regenerator 12 the repetition period of the PFP signal and that of the MCC signal included in the output pulse signal are detected and synchronization of the signals having frequencies $f_H$ and $f_A$ obtained by counting down is obtained by using the regenerated repetition period in the frame synchronizing signal regenerator 12. As mentioned above, the output pulse signal from the identifier 8 may include an error, but as the PFP signal and the MCC signal are included in the signal at a certain period there is no particular problem for the detection of the repetition period.

The output signal of the frame synchronizing signal regenerator 12 is applied to the gate circuit 10 and only the PFP signal is gated out from the still picture broadcasting signal in the output of the switcher 6. Amplitude of the gated out PFP signal is detected by the amplitude detector 9 and the output of the detector 9 is ›plied to the gain control circuit 5 so as to control the ıin of the signal in accordance with only the amplitude of the gated PFP signal. Thus, the level variation : the input still picture broadcasting signal is compenıted in accordance with the amplitude of the PFP sigıl and the controlled signal is applied to the input ter.inal 62 of the switcher 6.

The output signal of the frame synchronizing signal :generator 12 is also applied to frame synchronization ›nfirming circuit 13. The circuit 13 produces a conol signal when the frame synchronization is estabshed and applies the control signal to a control input :rminal 65 of the switcher 6 which operates to pass the ıput signal applied to the input terminal 62 which has o level variation to the output terminal. In the manner xplained as above, during the stationary term in which ıe frame synchronization is established, the still picıre broadcasting signal not including level fluctuation ; applied to the identifier 8 and an accurate identifiation is effected.

Confirmation of the establishment of the synchroniation in the frame synchronization confirming circuit 3 is carried out in the following manner.

In the frame synchronizing signal regenerator 12, the ıulse pattern of the PFP signal is detected from the outıut signal of the identifier 8 and by using a detected ıulse pattern the synchronizing signals having a hori.ontal scanning frequency $f_H$ synchronized with the ynchronizing signal of the input signal and that having ı PCM audio frame frequency $f_A$ also synchronized vith that of the input signal may be obtained. Accordngly, a logical product of the two synchronizing signals s made and the product is supplied to the frame syn:hronization confirming circuit 13. In the frame syn:hronization confirming circuit 13, the signal is peak letected. The time constant of the circuit 13 is so seected as to produce a voltage having an amplitude ex:eeding a certain predetermined value when a signal ıaving its frequency equal to the common measure fre]uency of frequencies $f_H$ and $f_A$ is applied to the circuit 13 repeatedly. This voltage is used as a control voltage of the switcher 6 and this voltage is applied to the con:rol input terminal 65 of the switcher 6 when this voltıge is produced. When this voltage is applied to the switcher 6, the switcher 6 switches so that the signal which had passed the gain control circuit 5 is delivered :o the output of the switcher 6 and then to the following stages. When the synchronization is not established in the frame synchronizing signal regenerator 12 and therefore a signal having a longer period than the above mentioned repetition period corresponding to the common measure frequency is applied to the frame syn:chronization confirming circuit 13, said voltage ex:ceeding a predetermined value does not appear so that the control voltage is not applied to the switcher 6. Therefore, the signal appearing at the input terminal 14 is directly passed to the following stages of the switcher 6.

FIG. 4 is a block diagram showing a different embodiment of the present invention. In FIG. 4, 17 is an adder, 18 is a high-pass filter, 19 a tank circuit having its center frequency corresponding to one-half of the bit frequency $f_b$ $(=1/t_b)$, 20 an amplitude separation circuit transmitting a signal having an amplitude exceeding a certain value, 21 a phase detector 22 a voltage controlled oscillator oscillating at the bit frequency $f_b$, 23, 24 a ½ frequency divider, and 25 a synchronization detector. The circuit further comprises gain control circuit 5, clamp circuit 7 and identifier 8 which are the same as the embodiment shown in FIG. 2.

The still picture broadcasting signal is applied to the input terminal 14 and to a high-pass-filter 18, which passes the bit frequency component of the PFP signal and PCM audio signal. The signal is then applied to gain control circuit 5 in which the amplitude of the signal is controlled and an output signal therefrom is added to the directly applied signal from the input terminal 14 in an adder 17 and then fed to the succeeding stages. The output signal of the adder 17 is supplied to the tank circuit 19 to emphasize its component having a bit period $t_b$ of the PFP signal and by passing amplitude separation circuit 20 only the signal having the bit period is derived. Then the signal is applied to the phase detector 21. In the ½ frequency divider 23, the output signal of the voltage controlled oscillator 22 is divided by one-half the frequency and the phase is compared with that of the output signal of the amplitude separation circuit 20 in the phase detector 21 a voltage corresponding to the phase difference is fed back to the voltage controlled oscillator 22 and a bit synchronizing signal synchronizing with that of the input still picture broadcasting signal is reproduced.

The output signal of the voltage controlled oscillator 22 is passed through ½ frequency divider 24 and applied to synchronization detector 25 and the synchronization detection is effected with the signal having a bit frequency in the output signal of the amplitude separation circuit 20 so that a voltage according to the amplitude or dc level of the bit frequency signal or mainly that of the PFP signal in the received still picture broadcasting signal is obtained. The obtained voltage is applied to the gain control circuit 5 and gain of the input signal is controlled, by which a stabilized signal is obtained by suppressing amplitude fluctuation of the bit synchronizing signal in the output signal of the adder 17. The output signal which has the amplitude variation suppressed is supplied to the clamp circuit 7 in which the dc level is fixed and then supplied to the identifier 8. By applying accurate identification a pulse signal not including waveform distortion is obtained at the output terminal 15.

Figure 5:
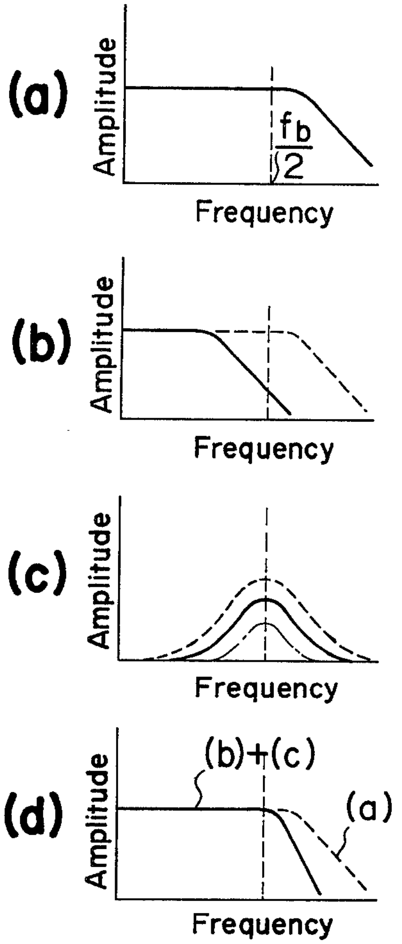

FIG. 5 shows the amplitude frequency characteristic of the signal in the several portions of the circuit shown in FIG. 4. FIG. 5a illustrates the amplitude frequency character of the normal still picture broadcasting signal which should be applied to the input terminal 14 under an ideal condition. However, in practice, the signal is distorted for instance, according to a deviation of the character of the receiver. Therefore, a signal as shown in FIG. 5b in which the higher frequency portion is distorted may appear at the input terminal 14. After passing the signal having its characteristic shown in FIG. 5b through the high-pass-filter 18 and the gain control circuit 5, a signal having the characteristics shown in FIG. 5c may be obtained. In FIG. 5c, the dotted line, full line and one dot chain line illustrate the cases in which the gain has been varied in the gain control circuit 5. As shown in this figure, by varying the gain of the frequency portion of $f_b/2$ of the bit synchronizing signal and by applying signals having two different frequency characteristics shown in FIG. 5b and FIG. 5c and by effecting an automatic gain control by the amplitude of the bit synchronizing signal component, a signal having a stabilized amplitude in the frequency region including the bit synchronizing signal component as shown in FIG. 5*d* can be obtained.

Figure 6:
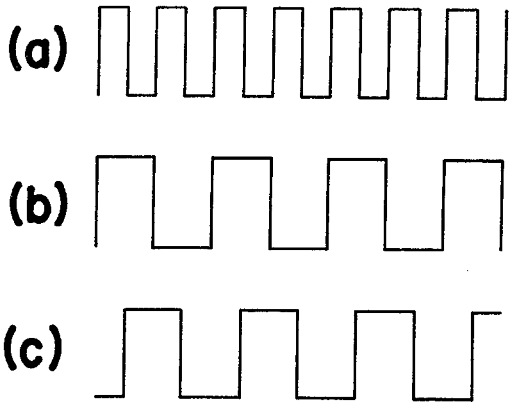

FIG. 6 shows diagrams of output waveforms of the voltage controlled oscillator 22 and the two ½ frequency dividers. FIG. 6*a* shows the output waveform of the oscillator 22. FIG. 6*b* shows the output waveform of the ½ frequency divider 23, FIG. 6*c* shows the output waveform of the ½ frequency divider 24. Usually, in an AFC circuit using phase detector 21, the stabilization is attained when the comparing signal and the output signal show 90° phase difference. Accordingly, the signal to be applied to the synchronization detector 25 is shifted in phase by 90° as shown in FIG. 6*c*.

FIG. 7 shows a practical circuit including the high-pass-filter 18, gain control circuit 5 and the adder 17 shown in the block diagram of FIG. 4.

The circuit portion including transitor $Q_1$ consists a high-pass-filter for amplifying of a high frequency region and the circuit portion including transistor $Q_2$ amplifies the lower frequency region. $Q_3$ –$Q_6$ transistors form the gain control circuit 5 and the adder 17. An AGC voltage terminal is applied with the output voltage of the synchronization detector 25. When the voltage at the terminal 26 becomes higher, the output signal appearing at an output terminal 27 contains more of the low frequency component amplified by the transistor $Q_2$ and also the high frequency component amplified by the transistor $Q_1$ decreases in the signal. When the voltage at terminal 26 decreases the output signals show the reverse result.

In the embodiment shown in FIG. 4 only the high frequency component of the still picture broadcasting signal is gain controlled automatically and the low frequency component is not made subject to the automatic gain control. However, the low frequency component is usually not subject to fluctuation due to the deviation of frequency characteristics of the tuners or intermediate frequency amplifying circuit in the overall receiver circuit so that there will be no particular problem by not adding a special gain control means.

As substantially mentioned above, according to the present invention, only the PFP signal portion is derived by using a gate circuit or tank circuit and by detecting the amplitude of this signal portion and using the detected amplitude, the gain of the input still picture broadcasting signal is controlled automatically so as to suppress the amplitude fluctuation so that an accurate identification may be expected.

We claim

1. An identifier for identifying a pulse code modulated signal in a composite signal incuding a video signal and a pulse code modulated audio signal, said video and audio signals being alternately transmitted in a predetermined sequence, said video and audio signals having a pulse coded synchronizing signal inserted in said video and audio signals with a predetermined repetition frequency, said pulse coded synchronizing signal including a predetermined number of pulses synchronized with pulses which form a pulse code of said pulse code modulated audio signal, comprising:

a gain control circuit having an input to which is applied the composite signal for controlling gain thereof, said control circuit including an output for the gain controlled composite signal;

a means for deriving a pulse series including a signal component having a frequency equal to said repetition frequency of said pulse coded synchronizing signal from said composite signal and for producing a continuous pulse signal synchronized with said pulses which form the pulse code;

a means for detecting an amplitude of said pulse coded synchronizing signal and for providing an output signal having a voltage proportional to the detected amplitude;

a means for controlling gain of said gain control circuit and for reducing variation of an amplitude of said composite signal by applying the output signal of the amplitude detecting means to said gain control circuit; and a means for identifying the gain controlled composite signal of the output of said gain control circuit, said identifying means including means for responding to the continuous pulse signal synchronized with said pulses which form the pulse code and for shaping a waveform of said gain controlled composite signal so as to obtain a complete pulse train signal.

2. An identifier as claimed in claim 1, further comprising a clamp circuit connected between said gain control circuit and said identifying means and providing an output signal, said clamp circuit fixing a dc level of the gain controlled composite signal of the output of said gain control circuit, and means for supplying the output signal of said clamp circuit to said identifying means.

3. An identifier for identifying a pulse code modulated signal in a composite signal including a video signal and a pulse code modulated audio signal, said video and audio signal being alternately transmitted in a predetermined sequence, said video and audio signals having a pulse coded synchronizing signal inserted in said video and audio signals with a predetermined repetition frequency, said pulse coded synchronizing signal including a predetermined number of pulses synchronized with pulses which form a pulse code of said pulse code modulated audio signal, comprising:

a gain control circuit having an input to which is applied the composite signal for controlling gain of the composite signal, said control circuit including an output for the gain controlled composite signal;

a means for deriving a pulse series includ a signal component having a frequency equal to said repetition frequency of said pulse coded synchronizing signal from said composite signal and for producing a continuous pulse signal synchronized with said pulses which form the pulse code; a means for gating out only said pulse coded synchronizing signal from the composite signal;

a means for detecting an amplitude of said pulse coded synchronizing signal which is gated by said gating means, said detecting means providing an output signal having a voltage proportional to the detected amplitude;

a means for controlling gain of the gain control circuit and for reducing variation of an amplitude of said composite signal by applying the output signal of the amplitude detecting means to the gain control circuit, and a means for indentifying the gain controlled composite signal of the output of the gain control circuit which has no amplitude variation, said identifying means including means for responding to the continuous pulse signal synchronized with said pulses which form the pulse code and for shaping a waveform of said gain controlled composite signal so as to obtain a complete pulse train signal.

4. An identifier for identifying a pulse code modulated signal in a composite signal including a video signal and a pulse code modulated audio signal, said video and audio signals being alternately transmitted in a predetermined sequence, said video and audio signals having a pulse coded synchronizing signal inserted in said video and audio signals with a predetermined repetition frequency, said pulse coded synchronizing signal including a predetermined number of pulses synchronized with pulses which form a pulse code of said pulse code modulated audio signal, comprising:

a gain control circuit having an input to which is applied the composite signal for controlling gain of the composite signal, said control circuit including an output for the gain controlled composite signal;

a band-pass-filter for passing a signal component of the gain controlled composite signal, said signal component having frequencies equal to that of the pulses which form said pulse coded synchronizing signal;

an amplitude separating means for passing signals having an amplitude exceeding a certain predetermined value;

a means for deriving a pulse series including a signal component having a frequency equal to said repetition frequency of said pulse coded synchronizing signal from said signal having an amplitude exceeding a certain predetermined value and for producing a continuous pulse signal synchronized with said pulses which form the pulse code;

a synchronization detector;

a means for supplying a signal passed from the band-pass-filter to said amplutide separating means;

a means for supplying the signals passed by said amplitude separating means and the pulse signal produced by said deriving and producing means to said synchronization detector, said synchronization detector providing an output signal;

a means for controlling gain of the gain control circuit and for reducing variation of an amplitude of said composite signal by supplying the output signal of the synchronization detector to said gain control circuit; and a means for identifying the gain controlled composite signal of the output of said gain control circuit.

5. An identifier for identifying a pulse code modulated signal in a composite signal including a video signal and a pulse code modulated audio signal, said video and audio signals being alternately transmitted in a predetermined sequence, said video and audio signals having a pulse coded synchronizing signal which is transmitted in a given period, said pulse coded synchronizing signal having a predetermined repetition frequency and including a number of pulses synchronized with pulses which form a pulse code of said pulse code modulated audio signal, comprising:

a gain control circuit having an input to which is applied the composite signal for controlling gain thereof, said control circuit including an output for the gain controlled composite signal;

a switcher for switching either to pass said composite signal from an input to an output of the switcher or to pass the gain controlled composite signal from an input to an output of the switcher;

a means for deriving a pulse series including a signal component having a frequency equal to said repetition frequency of said pulse coded synchronizing signal from said composite signal and for producing a continuous pulse signal synchronized with said pulses which form the pulse code;

a means for reproducing a synchronizing signal having a period equal to the period in which the pulse coded synchronizing signal is transmitted;

a synchronization confirming means for producing an output signal having a voltage of a predetermined value when the period of the synchronizing signal reproduced by the synchronizing signal reproducing means is equal to a predetermined period;

a gate circuit operated by said synchronizing signal reproduced by said means for reproducing, said gate circuit providing a gated output signal;

a means for supplying an output of the switcher to said gate circuit and a means for detecting an amplitude of the gated output signal, said detecting means providing an output signal having a voltage proportional to the detected amplitude;

a means for controlling gain of the gain control circuit and for reducing variation of an amplitude of said composite signal by applying the output signal of the amplitude detecting means to said gain control circuit;

a means for identifying an output signal of the switcher, said identifying means including means for responding to the continuous pulse signal synchronized with said pulses which form the pulse code of said pulse code modulated audio signal and for converting the composite signal into a pulse train signal; and a means for applying the output signal of the synchronization confirming means to said switcher and for causing said switcher to pass the gain controlled composite signal from the gain control circuit when the output signal of the synchronization confirming means has a value exceeding a predetermined value.

6. An identifier as claimed in claim 3, further comprising a clamp circuit having an output connected to an input of the means for identifying for fixing a dc level of the composite signal.

7. An identifier as claimed in claim 4, further comprising a clamp circuit having an output connected to an input of the means for identifying for fixing a dc level of the composite signal.

8. An identifier as claimed in claim 5, further comprising a clamp circuit having an output connected to an input of the means for identifying for fixing a dc level of the composite signal.

* * * * *